May 11, 1965 F. C. JOHNSTON ETAL 3,183,299
BUSWAY WITH RESILIENTLY BOWED HOUSING
Original Filed May 26, 1958 2 Sheets-Sheet 2

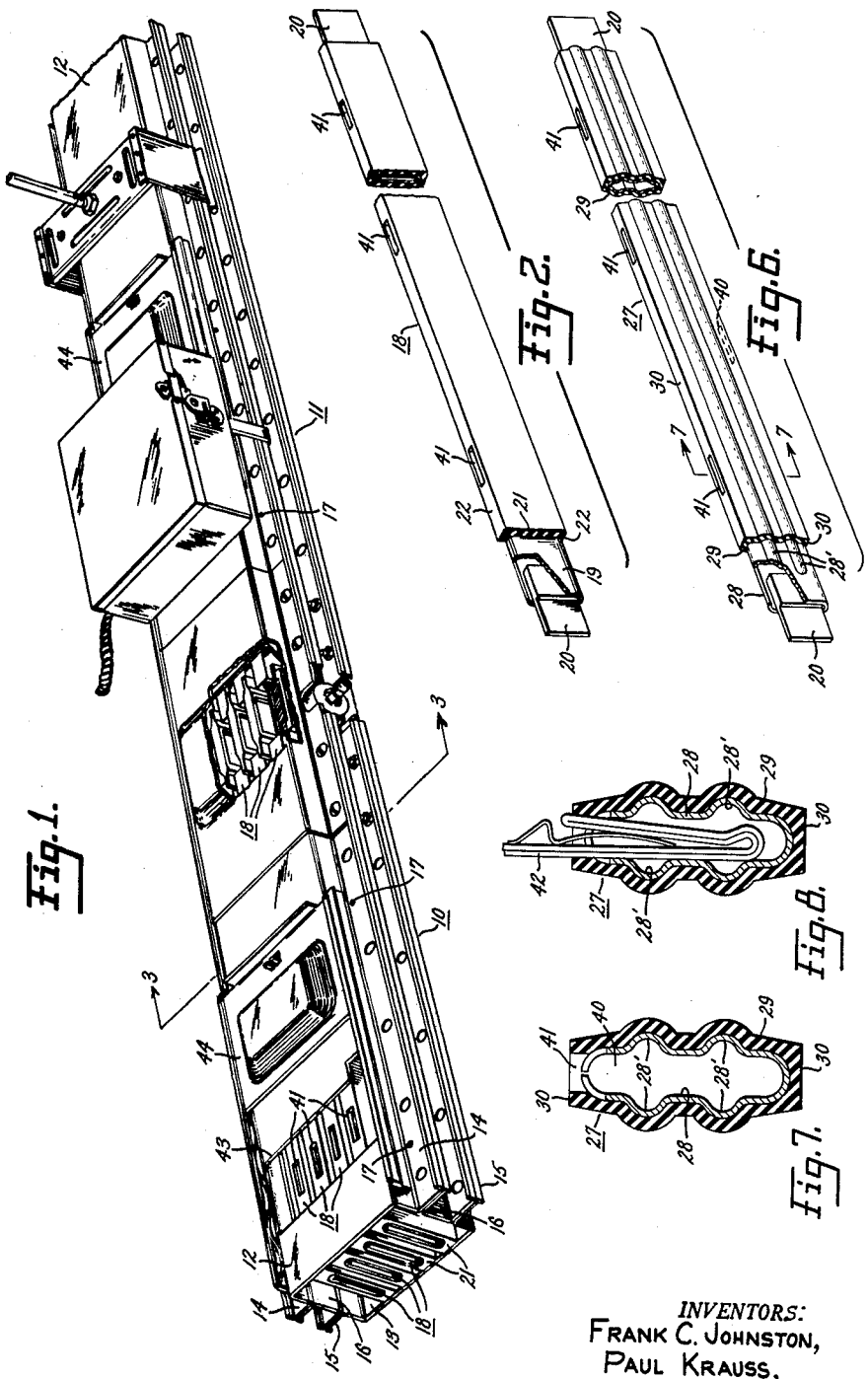

INVENTORS
FRANK C. JOHNSTON,
PAUL KRAUSS
BY David M. Schiller
ATTORNEY

3,183,299
BUSWAY WITH RESILIENTLY BOWED HOUSING
Frank C. Johnston, West Hartford, Conn., and Paul Krauss, Broomall, Pa., assignors to General Electric Company, a corporation of New York
Original application May 26, 1958, Ser. No. 737,954, now Patent No. 3,042,889, dated July 3, 1962. Divided and this application Apr. 16, 1962, Ser. No. 187,664
10 Claims. (Cl. 174—99)

This application is a division of our copending application Serial No. 737,954, filed May 26, 1958, and entitled "Busway System," now Patent No. 3,042,889.

This invention relates to electric power busways and particularly to the assembly of a busway housing about a plurality of bus bars.

In one well-known busway arrangement disclosed in U.S. Patent No. 3,018,320, a plurality of hollow bus bars are arranged within a housing in side-by-side relation with their edges adjacent opposed walls of the housing. Insulation is provided over a substantial length of the bus bars at least at the edges thereof which insulation is in contact with the opposed walls of the housing. The edges of the bus bars contain plug-in apertures which are spaced longitudinally thereof and which are aligned with openings formed in the insulation to receive plug-in connectors of current take-off devices. The arrangement disclosed in the aforementioned patent provides a busway of greatly reduced size, weight, and expense, since the bus bars may be closely spaced and may have reduced cross-sectional area of conducting material. In a busway of the type described it is very desirable that the bus bar insulation be in extremely tight thermal and frictional engagement with the housing so that heat generated in the bus bars by current passing therethrough is readily conducted directly through the insulation to the housing and there radiated directly to the outside air, and so that undesirable relative displacement between the bus bars and the housing is prevented. It is also desirable that the tight engagement between the bars and the housing be obtained without the provision of expensive and bulky pressure producing clamps on the busway.

It is therefore a primary object of the present invention to provide a novel and improved busway of reduced size, weight and expense wherein heat generated in the bus bars is effectively dissipated and the bars are firmly held in position by the busway housing.

It is another object of the present invention to provide a busway including a housing and a plurality of bus bars mounted in side-by-side relation in the housing with novel and improved means for effecting intimate thermal and frictional contact between the bus bars and the housing.

It is a further object of the invention to provide a busway including a housing having resilient housing parts and a plurality of insulated bus bars in side-by-side relation in the housing with novel and improved means for effecting very tight engagement between the housing parts and the edges of the insulated bars which engagement is maintained by the resiliency of the housing parts.

It is still another object of the invention to provide a novel and improved method of assembling a busway housing about a plurality of bus bars to provide an intimate thermal and frictional contact between the housing and the bus bars.

In carrying out the invention in one preferred form a busway is provided including a plurality of insulated bus bars in side-by-side spaced relation with their opposed edges in a pair of substantially parallel spaced planes. The insulation covers at least the edges of each bus bar and the bars are contained within a housing which comprises a pair of generally channel-shaped resilient housing parts positioned with the channels thereof in opposition and with their bases adjacent the edges of the bus bars. The bases of the housing parts are normally bowed about the central longitudinal axes thereof so that outer sections of the bases are spaced from the edges of the bus bars when the housing parts are initially assembled about the bars. The housing parts are connected in a manner such that the bases are deformed from the bowed configurations into generally planar configurations wherein the bases are resiliently urged into intimate thermal and frictional contact with the edge insulation of the bus bars. Each of the bus bars preferably is of hollow construction with a plurality of longitudinally spaced apertures in an edge thereof and the insulation for the bus bars contains openings aligned with the apertures to permit the entry of plug-in connectors through the aligned openings and apertures into the interior of the bus bars.

Other objects and advantages of the invention will become apparent from the following description taken in conjunction with the accompanying drawings in which:

FIG. 1 is a view in perspective of a portion of a busway incorporating the present invention.

FIG. 2 is a view in perspective of a bus bar assembly employed in the busway of FIG. 1.

FIG. 6 is a view in perspective of a bus bar assembly employed in the busway of FIG. 4.

FIG. 7 is a view in section taken along the line 7—7 of FIG. 6, and

FIG. 8 is a view similar to FIG. 7 showing a connector of a plug-in power take-off device in position within the bus bar.

Figure 3:
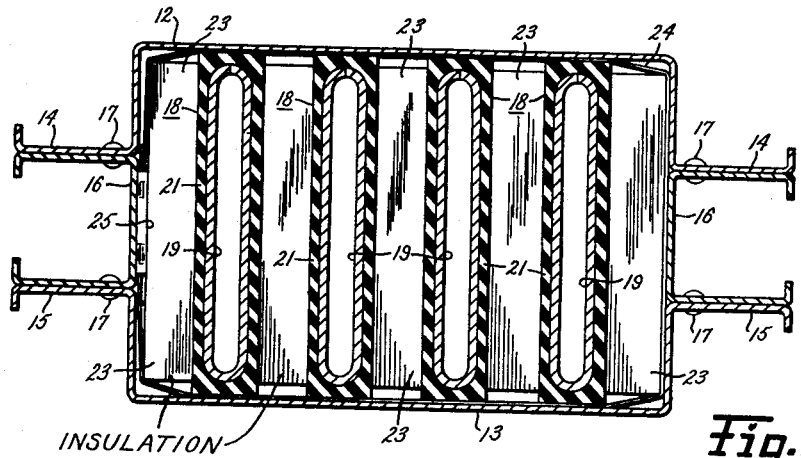
FIG. 3 is a view in section taken along the line 3—3 of FIG. 1.

Referring now to the drawings there is illustrated in FIG. 1 a busway incorporating the teachings of the present invention and including two busway sections 10 and 11 which are interconnected in any suitable manner. Each of the busway sections 10 and 11 includes an elongated duct or housing of generally rectangular cross-sectional configuration having generally channel-shaped top and bottom housing parts or cover members 12 and 13, respectively. The housing covers 12 and 13 are preferably formed of aluminum having a medium or low conductivity grade and proportioned to have resiliency so as to be deformable as will presently appear. The covers 12 and 13 include respectively outwardly directed flanges 14 and 15 and in the embodiment of FIGS. 1 and 3, the flanges 14 and 15 are rigidly connected to corresponding flanges of a channel shaped spacer 16 by any suitable means, such as rivets 17 which are longitudinally spaced along the busway.

The busway includes a plurality of bus bar assemblies 18 mounted within the housing and at best shown in FIG. 2, each of the assemblies 18 includes a generally hollow tubular conductive bar 19 having solid metallic contact plugs 20 fitted partially within the ends thereof and permanently attached thereto. As shown, the bus bars are generally rectangular, and moreover, each is relatively wider than it is thick and had a first transverse cross-sectional dimension substantially greater than a second cross-sectional dimension measured at right angles to the first dimension. A coating of suitable insulation 21 having flattened top and bottom edges 22 covers substantially the entire outer surface of the bar 19. The arrangement of the bus bar assembly 18 forms no part of the present invention and is disclosed and claimed in the aforementioned application Serial No. 737,954 of which the present application is a divisional. The method of forming a bus bar assembly similar to the assembly 18 is disclosed and claimed in application Serial No. 187,665, filed April 16, 1962 by Frank C. Johnston and Paul Krauss and assigned to the assignee of the present invention. This latter application also is a divisional of the aforementioned application Serial No. 737,954.

The bus bar assemblies 18 are maintained in spaced-apart side-by-side relation relative to one another by means of insulating spacer blocks 23 shown in FIG. 3, and the assemblies 18 and blocks 23 are tightly compressed together by means of a strap 24 having its ends overlapped and connected under tension as shown at 25. While only one assembly of blocks 23 and a strap 24 is illustrated, this insulating and spacing assembly is repeated at regular intervals longitudinally of the busway, there being about one foot between successive insulating and spacing assemblies. The blocks 23 are independent of the covers 12 and 13 thereby permitting the formation of covers without bus bar spacers attached thereto which tend to render the covers non-resilient.

In FIGS. 4–8 there is shown a modified form of bus bar conductor assembly 27 suited for use with electric currents of lower values than the assemblies 18, and therefore utilizing relatively thin wall sheet metal material. In this embodiment each assembly 27 is formed of a generally tubular conductive bar 28 having transversely spaced and longitudinally extending strengthening ribs 28'. The bus bar 28 has a coating 29 of insulating material covering substantially its entire outer surface and having flattened top and bottom portions 30 for contacting cover portions 31 and 32 of the busway housing. In the embodiment under discussion the height of the bus bar assemblies 27 is less than that of the assemblies 18 and the spacer 16 utilized in the embodiment of FIGS. 1 and 3 is omitted in the embodiment of FIGS. 4–8. Insulating and spacing assemblies similar to the assemblies comprising the blocks 23 and straps 24 of FIG. 3 are also provided in the embodiment of FIGS. 4–8.

Figure 4:
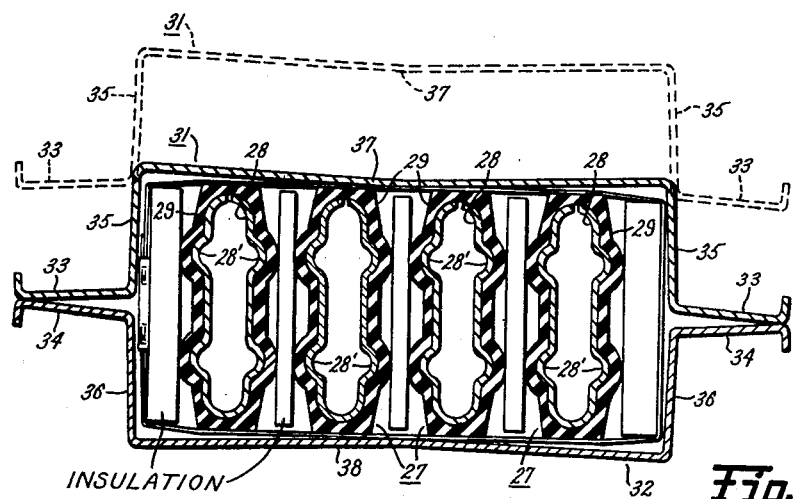
FIG. 4 is a view in section similar to FIG. 3 showing a busway of modified form with the housing parts thereof in an intermediate stage of assembly relative to the bus bars.

The present invention is applicable to either of the embodiments described herein but will be described in detail in connection with the embodiment shown in FIGS. 4–8. In accord with the invention the resilient covers of the busway housing are deformed when connected together so as to be in intimate thermal and frictional contact with the insulation on the edges of the bus bars which contact is effectively maintained by the resiliency of the covers. The covers 31 and 32 of the busway of FIG. 4 include respectively outwardly-directed flanges 33 and 34 which extend respectively from sidewalls 35 and 36 connected by means of bases 37 and 38. Each of the covers 31 and 32 is formed in any suitable manner with a slight bend or bow about the central longitudinal axis thereof as best shown in FIG. 4. As shown, therefore, the covers are normally, i.e., in their free or unassembled condition, bowed slightly about their central longitudinal axis. In FIG. 4 the cover 31 is represented by dotted lines in a position prior to assembly thereof to the bus bar assemblies and in full lines in an intermediate stage of assembly to the bus bar assemblies. The bowed configurations of the bases 37 and 38 of the covers 31 and 32 result in the outer sections of the bases being spaced from the flat surfaces of the insulation of the bus bars when the covers 31 and 32 are partially assembled thereto as shown in FIG. 4. The sections of the base of each cover on opposite sides of the cover center line preferably form an angle of the order of three degrees. Each cover is also formed so that the flanges 33 and 34 define with their adjacent sidewalls 35 and 36 angles which are slightly in excess of ninety degrees, so that when the two covers 31 and 32 are assembled about the bus bar assemblies, the flanges 33 and 34 are spaced from each other at areas thereof adjacent the sidewalls.

Figure 5:
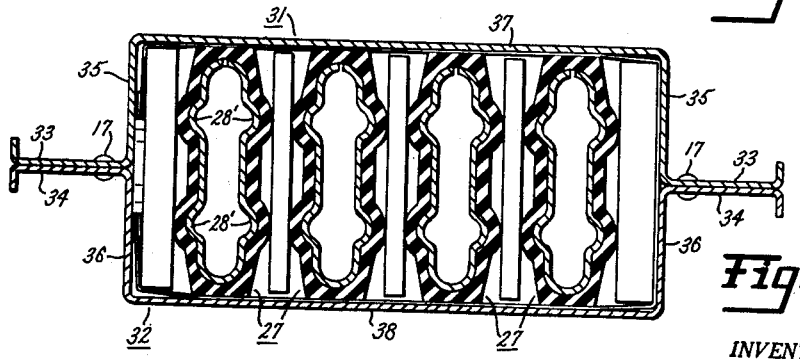
FIG. 5 is a view similar to FIG. 4 showing the housing parts in completely assembled condition.

In order to fasten the covers 31 and 32 to each other the covers 31 and 32 are deformed so that the bases 37 and 38 thereof are bent from the bowed configurations shown in FIG. 4 to generally planar configurations shown in FIG. 5, and the flanges 33 and 34 are moved into engagement along substantially their entire planar area as shown in FIG. 5. The covers are then fastened by means of rivets 17 located in the flanges 33 and 34 adjacent the inner portions thereof and spaced longitudinally along the housing. The covers are thus attached in stressed conditions with the covers tending to separate and revert to their normal bowed conditions. Forces are thereby established which urge the bases 37 and 38 of the covers into intimate thermal and frictional contact with the flat upper and lower edges of the bus bar insulation, and such contact is effectively maintained by the resiliency of the covers. In other words, the housing covers are inherently biased, that is, biased by forces generated by the covers themselves, into intimate thermal and frictional contact with the insulation on the bus bars.

With the described arrangement the strong frictional engagement between the bus bar assemblies and the housing covers is the sole means preventing relative sliding movement of the bus bar assemblies and the housing. It has been determined by tests on a four pole, one thousand ampere busway section, such as shown in FIG. 3, that weights totaling one hundred and thirty pounds attached to each bus bar assembly of a ten foot length of busway and maintained for two and one-half hours caused no perceptible movement of the bus bar assemblies with respect to the housing. Following this test, additional weights were attached to each bus bar assembly up to the maximum that could practically be attached thereto, which approximated a total weight of two hundred and thirty seven pounds per bus bar assembly, and this was maintained for a period of twenty-four hours, at the end of which time no relative movement of the bus bar assemblies with respect to the housing could be detected.

Each of the assemblies 18 and 27 has provision for receiving plug-in devices. For this purpose, the bus bars 19 and 28 include longitudinally spaced openings 40 in at least one edge thereof which are aligned with apertures 41 formed in the insulation. One opening 40 is shown in FIG. 6 in the lower edge of the bus bar 28 of the assembly 27, and in FIG. 7 an opening 40 is shown in the upper edge of the bus bar 28. The apertures 41 are preferably smaller than the openings 40 so as to provide a so-called "dead front" arrangement. In FIG. 8 a connector 42 is shown extending through an aperture 41 and the aligned opening 40 to contact the inner surfaces of the bus bar 28. The housing covers 12 and 13 and 31 and 32 are each provided with longitudinally spaced enlarged openings 43 to permit entrance of connector 42. The openings 43 are closed by sliding covers 44.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. An electric power busway comprising a plurality of bus bars in side-by-side spaced relation with their opposed edges in two substantially parallel spaced planes, insulation covering at least the edges of each bus bar, an elongated housing surrounding said bus bars comprising a pair of resilient housing parts having bases normally inwardly bowed about their longitudinal center lines, said housing parts being positioned with their bases adjacent the edges of said bus bars, and means connecting said housing parts in deformed condition flattening said bases against the bus bar edges in intimate thermal and frictional contact with said insulation of said bus bars.

2. An electric power busway comprising a plurality of bus bars in side-by-side spaced relation with their opposed edges in substantially parallel spaced planes, insulation covering at least the edges of each bus bar, an elongated housing surrounding said bus bars comprising a pair of generally channel shaped resilient covers having channel bases and positioned with the channels in opposition and with the bases adjacent the edges of the bus bars, the bases of said covers being normally bowed about the central longitudinal axes thereof and means connecting said covers and deforming said bases from said bowed configurations into generally planar configurations, said bases being resiliently urged into intimate thermal and frictional contact with the insulation of the bus bars.

3. An electric power busway comprising a plurality of bus bars in side-by-side spaced relation with their opposed edges in substantially parallel spaced planes, insulation covering at least the edges of each bus bar, an elongated housing surrounding said bus bars comprising a pair of generally channel shaped resilient covers having channel bases and positioned with the channels in opposition and with the bases adjacent the edges of the bus bars, the bases of said covers being normally bowed about the central longitudinal axes thereof spacer means independent of said covers between adjacent bus bars maintaining the bars in spaced relation, and means connecting said covers and deforming said bases from said bowed configurations into generally planar configurations whereby said bases are inherently resiliently biased into intimate thermal and frictional contact with said insulation of said bus bars.

4. An electric power busway comprising a plurality of bus bars in side-by-side spaced relation with their opposed edges in two substantially parallel spaced planes, insulation covering at least the edges of each bus bar, an elongated housing surrounding said bus bars comprising a pair of generally channel shaped resilient covers each having a pair of spaced side walls connected by a base and a pair of flanges extending laterally from the side walls, said covers being positioned with the channels in opposition and with the bases adjacent the edges of the bus bars, the bases of said members being normally bowed about the central longitudinal axes thereof and the flanges of said covers normally forming with the adjacent side walls angles greater than ninety degrees, and means connecting said covers and deforming said flanges and adjacent side walls into substantially ninety degree relationships and deforming said bases from said bowed configurations into generally planar configurations whereby said bases are inherently resiliently biased into intimate thermal and frictional contact with the insulation of the bus bars.

5. A busway as defined in claim 4 wherein said means connecting comprises longitudinally spaced fasteners attaching the flanges of the members.

6. A busway as defined in claim 4 wherein said means connecting comprises a pair of generally U-shaped spacers having flanges and positioned between adjacent flanges of said covers with the flanges of the spacers adjacent the flanges of said covers, and longitudinally spaced fasteners attaching the flanges of said spacers and the flanges of said covers.

7. An electric power busway comprising a plurality of bus bars in side-by-side relation with their opposed edges in two substantially parallel spaced planes, insulation covering at least the edges of each bus bar, an elongated housing surrounding said bus bars comprising a pair of generally channel shaped resilient covers each having a pair of spaced side walls connected by a base and a pair of flanges extending laterally from the side walls, said covers being positioned with the channels in opposition and with the bases adjacent the edges of the bus bars, the bases of said covers being normally bowed about the central longitudinal axes thereof so that outer parts of the bases are spaced from the bus bars, and the flanges of said covers normally forming with the adjacent side walls angles greater than ninety degrees, spacer means independent of said covers between adjacent bus bars maintaining the bars in spaced relation, and means connecting said covers deforming said flanges and adjacent side walls into substantially ninety degree relationships and deforming said bases from said bowed configurations into generally planar configurations whereby said bases are inherently resiliently biased into intimate thermal and frictional contact with said insulation of the bus bars.

8. An electric power busway comprising a plurality of bus bars in side-by-side spaced relation with their opposed edges in two substantially parallel spaced planes, insulation covering at least the edges of each bus bar and having flat portions at the edges of the bus bars, an elongated housing surrounding said bus bars comprising a pair of generally channel shaped resilient covers each having a pair of spaced side walls connected by a base and a pair of flanges extending laterally from the side walls, said covers being positioned with the channels in opposition and with the bases adjacent the edges of the bus bars, the bases of said members being normally bowed about the central longitudinal axes thereof, the flanges of said covers normally forming with the adjacent side walls angles greater than ninety degrees, and means connecting said covers and deforming said flanges and adjacent side walls into substantially ninety degree relationships and deforming said bases from said bowed configurations into generally planar configurations, said bases being inherently resiliently biased into intimate thermal and frictional contact with said flat portions of the insulation of the bus bars.

9. An electric power busway comprising a plurality of elongated bus bars of generally rectangular cross-section having a first transverse cross-sectional dimension corresponding to a broad outer surface thereof substantially greater than a second transverse cross-sectional dimension perpendicular thereto corresponding to a narrow surface thereof, said bus bars being disposed in parallel relation with said broad surfaces of said bars extending in parallel planes, insulation covering substantially all of said surfaces of said bus bars intermediate the ends thereof, an elongated housing surrounding said bus bars comprising a pair of resilient sheet metal housing parts having bases normally inwardly bowed about their longitudinal center lines, said housing parts being positioned with their bases against said insulation, and means connecting said housing parts and deforming said housing parts into generally planar condition, said bases being inherently resiliently biased into intimate thermal and frictional contact with said bus bar insulation.

10. An electric power busway as set forth in claim 9, wherein said housing parts each comprise a generally channel-shaped sheet metal member, comprising opposed parallel side portions terminating in outwardly directed flange portions and an intermediate portion at right angles thereto, said bases forming said intermediate portion, and wherein said connecting means comprises means interconnecting adjacent flange portions of said housing parts.

References Cited by the Examiner

UNITED STATES PATENTS

| | | | |
|---|---|---|---|
| 2,059,986 | 11/36 | Frank et al. | 339—22 |
| 2,264,075 | 11/41 | Frank | 339—22 |
| 2,869,098 | 1/59 | Sauer | 339—91 X |
| 3,018,320 | 1/62 | Rowe | 339—22 X |

FOREIGN PATENTS 1,074,935  4/54  France.

LARAMIE E. ASKIN, Primary Examiner.

JOSEPH D. SEERS, E. JAMES SAX, Examiners.